United States Patent Office 3,639,552
Patented Feb. 1, 1972

3,639,552
METHOD OF PRODUCING FERRO-CEMENT PIPES
Michal Sandowicz, Ul. Dabrowicka 12,
Warsaw 33, Poland
Filed Oct. 17, 1968, Ser. No. 769,476
Int. Cl. B28b 1/08
U.S. Cl. 264—71                                      3 Claims

ABSTRACT OF THE DISCLOSURE

A method of molding a ferro-cement pipe with a multilayer mesh reinforcement therein comprising moving an annular piston element downwardly within and in engagement with the interior surface of an external mold, an internal core surrounded by the multi-layer mesh reinforcement moving with the piston element, wet cement being introduced into the upper end of the mold cavity between the external mold and the internal web while vibrating the concrete, and then removing the internal core. A funnel is temporarily provided at the upper end of the external mold for receiving concrete.

In view of the fact that ferro-cement has been known but a short time in building technique, the method of producing ferro-cement pipes is still in the experimental stage. Heretofore, the method of bending, torquetting, winding and rotating has been known. The large number of seams and the complexity of making the contact points of pipes are among the defects of the method of bending pipes. The inconvenience in the method of torquetting is the difficulty arising from the placement of the reinforcing meshes in the section of the pipe. The drawback in rotation is the delamination of the concrete masses between the meshes and the displacement of the meshes in the section of the pipe. To the defects of the method of winding should be added the high relationship existing between the proper formation of the fresh concrete mass in the form of thin layers for achieving its consistency, the necessity of floating the last layer and the putting on of a special external mold in order to produce an appropriate casing, the necessity of taking the pipe each time out of the apparatus together with the steel web and the external steel covering, and leaving it in such a state until the concrete hardens.

The purpose of the present invention is to remove the inconveniences noted above, attaining simplicity and precision in each operation during the production of pipes and to obtain high quality as a result.

The problems set forth were solved in accordance with the present invention, which is illustrated in the drawings, wherein.

Figures 3, 4:
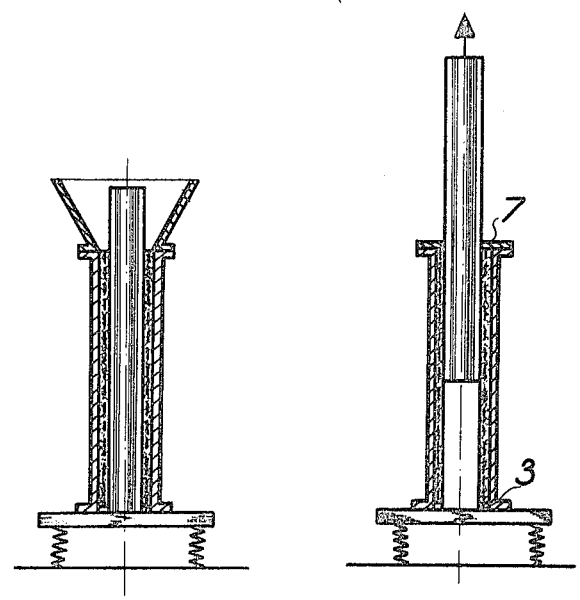
FIG. 3 shows a further step in the method.

FIG. 4 discloses the withdrawal of an inner core.

Figures 1, 2:
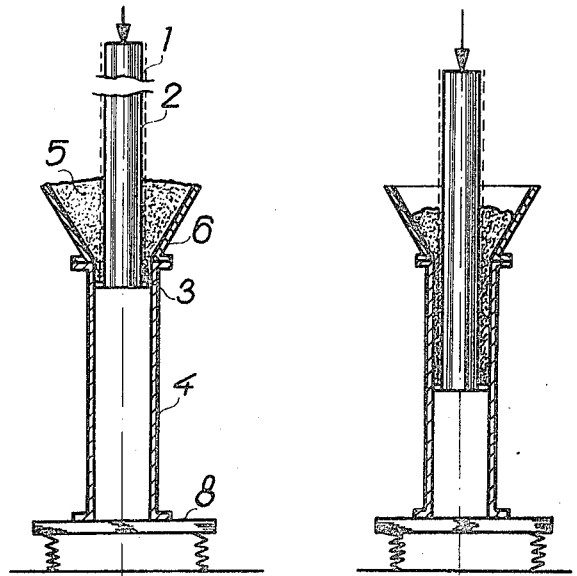
FIG. 1 is an elevational view of an apparatus for carrying out the invention method in a first position thereof.
FIG. 2 is a view showing an intermediate step in the formation of a ferro-concrete pipe in accordance with the invention.

Referring now to FIG. 1, there is diagrammatically shown a multi-layer reinforcing mesh 1 of generally tubular form, placed in spaced surrounding relationship to an inner mold core 2. At the lower end of the mesh 1, there is provided an annular piston 3, the inner diameter of which is in engagement with the exterior of the core 2. The outer diameter of the annular piston 3 is in engagement with the inner diameter of an external mold 4; the mesh 1 has a lesser diameter than that of the mold 4. On top of the mold 4 there is a temporarily placed extension having the shape of a funnel 6 which receives a mass of wet concrete 5, that may be seen in FIG. 1 to extend into the mold cavity defined between the outer surface of the core 2 and the inner surface of the external mold 4. The external mold 4 may be seen to be supported by a base 8 which includes vibration equipment which may be actuated to vibrate the parts hereinabove noted, together with the concrete mass 5.

The method of producing ferro-cement pipes in accordance with the invention proceeds, for example, most advantageously as follows:

With the apparatus thus arranged, the external mold 4 is vibrated together with the concrete mass 5 by the vibrational apparatus and at the same time the core 2 together with the mesh reinforcement 1 and the piston 3 are moved downwardly by hydraulic equipment, for example, along the mold 4. While the core 2 moves along the mold 4, a gradual penetration of the concrete mass 5 which is in funnel 6 through the mesh reinforcement 1 is achieved and a gradual filling up of the cavity between the core 2 and the mold 4 follows, progressing as shown in FIG. 2. This process lasts until the walls of the ferro-cement pipes are completely molded, that is until piston 3 see FIG. 3, reaches the bottom of the mold 4. After the molding of the pipe is completed, an annular stop collar 7 see FIG. 4, is put on in place of the funnel 6, the piston 3 is detached from the core 2, then the core 2 is removed from the inside of the ferro-cement pipe and then the pipe is removed from the mold 4.

In order to avoid placing the apparatus for moving the web, a hydraulic ram for example, along the mold over the core 2 or inside it, it is advantageous to make the core 2 together with the piston 3 and the multi-layer mesh reinforcement 1 fixed, and to move the external mold 4.

The ferro-cement pipes produced in accordance with the invention can be used as pressure pipes for conducting liquids or gases, as casings for all kinds of pipes or they can be bearing members of building structures. The thickness of the walls of the known ferro-cement pipes is within the limits of 10–40 mm. and are reinforced by many layers of steel mesh of dimensions of mesh witihn 0.5–1.2 cm. and wire of a thickness of 0.5 to 1.2 mm. The considerable density of the mesh reinforcement in the walls of the pipes creates a specific difficulty in the production of reinforced cement pipes, consisting, inter alia, in the resistance to free penetration of the concrete mass through the dense reinforcement. This difficulty has been eliminated in the method according to the invention because the concrete mass penetratrates throughout the entire length of the pipe and covers the mesh reinforcement. The result obtained by the invention are pipes of high quality, resistant to cracking, watertight, and resistant to dynamic action.

What I claim is:
1. A method of producing a ferro-cement pipe comprising:
   (a) placing a multi-layer mesh reinforcement of mesh dimensions within 0.5–1.2 cm. and wire of a thickness of 0.5–1.2 mm. around and spaced from an inner mold core,
   (b) placing an annular piston at the bottom of said reinforcement and core between said core and the upper end of an external mold of greater diameter than said mold core, with said external mold having the narrow end of a funnel at the upper end thereof,
   (c) supplying wet concrete to said funnel,
   (d) vibrating said concrete in said funnel to cause the concrete to penetrate through said mesh reinforcement to the external surface of said mold core to thereby create the internal surface of the ferrocement pipe being formed,

(e) moving said reinforcement, core, annular piston and concrete into the interior of said external mold while continuing the vibration of said concrete to thereby create the external surface of the ferro-cement pipe being formed, (f) removing said funnel and placing an annular stop on the upper end of the ferro-cement pipe, around the core, (g) and then removing said core from within said concrete, reinforcement, and mold.

2. The method of claim 1, wherein said mold and funnel are stationary, and said core and piston are slidable in relation to them.

3. The method of claim 1, wherein said core and piston are stationary, and said mold and funnel are slidable in relation to them.

References Cited

UNITED STATES PATENTS

| | | | |
|---|---|---|---|
| 3,119,165 | 1/1964 | Gourlie | 25—30 |
| 2,800,700 | 7/1957 | Clement | 25—36 |
| 2,544,453 | 3/1951 | Gaudin | 25—36 |
| 2,602,980 | 7/1952 | Bryan | 25—38 |

FOREIGN PATENTS

| | | | |
|---|---|---|---|
| 1,102,372 | 2/1968 | Great Britain | 25—30 |

ROBERT F. WHITE, Primary Examiner

J. H. SILBAUGH, Assistant Examiner

U.S. Cl. X.R.

25—30 R, 41 J